United States Patent
Egan et al.

(10) Patent No.: US 10,339,512 B2
(45) Date of Patent: Jul. 2, 2019

(54) IN-SCANNER DOCUMENT IMAGE PROCESSING

(71) Applicants: Greg Scott Egan, Flowery Branch, GA (US); Nathaniel Christopher Herwig, Lawrenceville, GA (US); Erick Kobres, Lawrenceville, GA (US)

(72) Inventors: Greg Scott Egan, Flowery Branch, GA (US); Nathaniel Christopher Herwig, Lawrenceville, GA (US); Erick Kobres, Lawrenceville, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 14/575,579

(22) Filed: Dec. 18, 2014

(65) Prior Publication Data
US 2016/0180166 A1 Jun. 23, 2016

(51) Int. Cl.
*G06Q 20/20* (2012.01)
*H04N 1/00* (2006.01)
*G06K 9/00* (2006.01)

(52) U.S. Cl.
CPC .......... *G06Q 20/20* (2013.01); *G06Q 20/208* (2013.01); *H04N 1/00803* (2013.01);
(Continued)

(58) Field of Classification Search
CPC .................................................. G06Q 20/20
(Continued)

(56) References Cited

U.S. PATENT DOCUMENTS

| 5,321,751 | A | * | 6/1994 | Ray | G06Q 20/341 |
|---|---|---|---|---|---|
| | | | | | 283/904 |
| 7,770,013 | B2 | | 8/2010 | Rhoads et al. | |

(Continued)

FOREIGN PATENT DOCUMENTS

| CN | 1655161 A | 8/2005 |
|---|---|---|
| CN | 103379282 A | 10/2013 |
| CN | 103578187 A | 2/2014 |

OTHER PUBLICATIONS

European Search Report dated Sep. 18, 2017 in copending European Patent Application 15191246.6.
(Continued)

*Primary Examiner* — King Y Poon
*Assistant Examiner* — Michael Burleson
(74) *Attorney, Agent, or Firm* — Schwegman, Lundberg & Woessner

(57) ABSTRACT

Various embodiments herein each include at least one of systems, methods, data structures, and software for document image processing within a device such as a retail scanner. One such embodiment, in the form of a method, includes receiving a document image from an imaging device of a scanner and determining a type of the document represented in the document image. The document image may then be processed to obtain document metadata and the document image and metadata representative of the document metadata and document type are added to a data structure. This method may further include adding transaction-related metadata to the data structure. The data structure may then be stored on the scanner, transmitted via local communications link to a host device, transmitted via a network to a database for storage, or transmitted via a network to another system for one or both of processing and storage.

17 Claims, 4 Drawing Sheets

(52) U.S. Cl.
CPC ..... *G06K 9/00295* (2013.01); *G06K 9/00469* (2013.01); *G06K 2009/00322* (2013.01)

(58) Field of Classification Search
USPC ........................................................ 358/462
See application file for complete search history.

(56) References Cited

U.S. PATENT DOCUMENTS

| | | |
|---|---|---|
| 7,983,452 B2 | 7/2011 | Chaney et al. |
| 9,049,379 B2 | 6/2015 | Choi et al. |
| 9,684,819 B2 | 6/2017 | Choi et al. |
| 2004/0153649 A1* | 8/2004 | Rhoads ............... G06F 17/241 713/176 |
| 2009/0037515 A1* | 2/2009 | Zapata ............... H04L 43/0811 709/202 |
| 2009/0052751 A1 | 2/2009 | Chaney et al. |
| 2013/0286256 A1* | 10/2013 | Choi ............... H04N 5/23219 348/240.2 |
| 2013/0338820 A1 | 12/2013 | Corbett et al. |
| 2013/0338823 A1 | 12/2013 | Letizia et al. |
| 2015/0261990 A1 | 9/2015 | Kim et al. |

OTHER PUBLICATIONS

European Search Report in co-pending European patent application EP 15191246.6 dated Jan. 22, 2016.

\* cited by examiner

IN-SCANNER DOCUMENT IMAGE PROCESSING

BACKGROUND INFORMATION

During a checkout process in retail or other environments, it is common for customers to present one or more of various document types. Such documents may include checks, identification cards, bankcards such as debit or credit cards, membership cards, library cards, and the like. One or more of these documents may be presented for a variety of purposes ranging from making a payment and validating a customer identity to confirming date of birth and address verification. These documents are typically presented at a Point of Sale (POS) terminal, which may be a cashier-assisted lane, a Self-Service Terminal (SST) or other kiosk terminal that may or may not involve payment. At later times, transactions performed at such terminals may be audited for security, compliance, training, and other purposes. However, only some of the presented documents may be available, such as a presented check or data magnetically read from a bankcard. This may present a security or compliance exposure for an operating entity, especially when an identification card is needed in completing a transaction for compliance with laws and regulations applicable to purchase or otherwise obtaining certain controlled items (e.g., alcohol, tobacco, and pharmaceutical products).

SUMMARY

Figure 1:
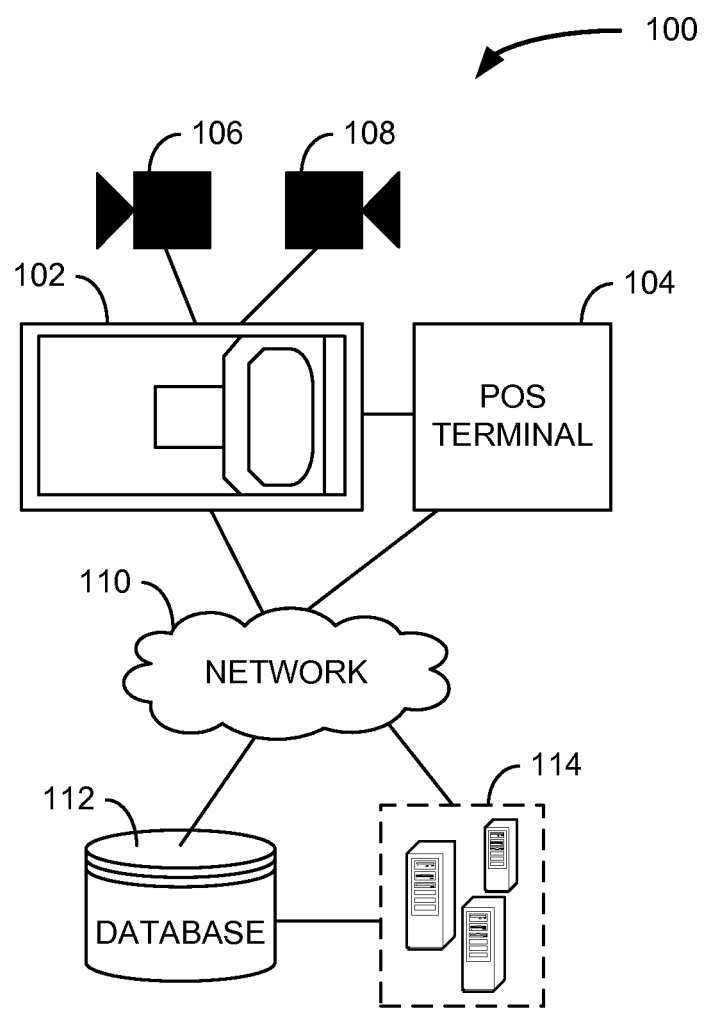
FIG. 1 is a logical block diagram of a system including a scanner, according to an example embodiment.

Various embodiments herein each include at least one of systems, methods, data structures, and software for in-scanner document image processing.

One such embodiment, in the form of a method, includes receiving a document image from an imaging device of a scanner and determining a type of the document of the document image. The document image may then be processed to obtain document metadata and the document image, and metadata representative of the document metadata and document type are added to a data structure. This method may further include adding transaction-related metadata to the data structure. The data structure may then be stored on the scanner, transmitted via local communications link to a host POS terminal or kiosk, transmitted via a network to a database for storage, or transmitted via a network to another system for one or both of processing and storage.

Another embodiment in the form of a method includes scanning each of a plurality of documents presented on a scanning surface of a scanner to obtain document images. This method then determines a type of each document for each document image and processes each document image to obtain a set of respective document metadata. Each document image and each respective set of document metadata including data representative of the respective document type is then added to a data structure and the data structure is stored.

One device embodiment is a scanner. The scanner of such embodiments includes at least one processor, at least one memory device, at least one imaging device, and a communication interface device. The at least one memory device stores instructions that are executable by the at least one processor to perform data processing activities. These data processing activities include receiving a document image from a first imaging device of the at least one imaging devices and determining a type of the document of the document image. The data processing activities further include processing the document image to obtain document metadata and adding the document image and metadata representative of the document metadata and document type to a data structure in the at least one memory device.

DETAILED DESCRIPTION

Various embodiments herein each include at least one of systems, methods, data structures, and software for in-scanner document image processing. In some embodiments, the document image processing is performed within a scanner, such as a product scanner that may be present at a POS terminal or other kiosk terminal including a scanner such as a product scanner.

Some embodiments leverage one or more imaging devices present in a scanner to capture an image of each of one or more documents presented as part of a transaction, such as an identification card, a check, bankcard (e.g., credit card, debit card, prepaid card), membership card, library card, loyalty card, etc.). Each captured image may then be processed on the scanner to identify a document type and to extract or generate certain data from the document included in the image. In some embodiments, the data extracted or generated from the document may then be used for various forms of validation, such as validating a person is at least a certain age, that identification card information matches account holder information on a check or credit card, and the like. In some embodiments, each document image, data of the document, and a record of any validation performed are bundled into a single data structure that may be stored locally to the scanner, provided to a terminal coupled to the scanner, transmitted from the scanner via a network for storage elsewhere such as in a database, or is otherwise stored. The single data structure may also include a token, such as a transaction identifier, a date time stamp, or other data to assist in later retrieval. The single data structure, in some embodiments, is encrypted prior to storing or transmission.

In some such embodiments, the scanner may also be coupled to one or more other imaging devices external to the scanner, such as cameras. The one or more other imaging devices may be coupled to the scanner either physically, via a network, or via a wired or wireless connection. The one or more imaging devices may each be directed in different directions. For example, one imaging device may be directed toward a customer presenting the one or more documents while another imaging device may be directed toward a clerk stations, such as that of a cashier. Images may be captured from the imaging devices and added to the data structure in the scanner to add information to the data structure of the people that participated in the transaction. Such data may be useful to audit a particular transaction to verify the people involved, such as when a transaction is later determined to involve fraud or a violation of law or policy. In some embodiments, the validation performed may include facial recognition processing between a facial image included on a presented document such as a driver's license and a face of a customer captured by an external imaging device.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, peripheral device, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100 including a scanner, according to an example embodiment. The system 100 is an example of deployment in a retail environment, although the various embodiments herein are also applicable to other environments, such as customer service kiosks and library checkouts, travel check-in kiosks, among others.

The system 100 includes a scanner 102 coupled to a terminal 104. The scanner 102 may be a product scanner or similar scanning device in some embodiments. An example of such a scanner is the REALSCAN 79 BI-OPTIC IMAGER available from NCR Corporation of Duluth, Ga. Such modern scanners utilize one or more cameras in performing their scanning functions. As such, these cameras may be utilized to capture images of presented documents.

The terminal 104 may be a modern cash register serviced by a checkout clerk or cashier, or it can be a self-checkout terminal or other Self-Service Terminal (SST), customer service kiosk, and the like. In some embodiments, the scanner 102 is coupled, via either wired or wireless connections, to one or more additional cameras, such as cameras 106, 108. However, various embodiments may include no cameras, one camera, and more than two cameras. In some embodiments, the camera 106 may be pointed in the direction of a customer presenting items to purchase and documents to complete a purchase transaction at the terminal 104. Similarly, the camera 108 may be pointed in the direction of a terminal 104 clerk.

The system 100 also typically includes a network 110 that connects one or both of the scanner 102 and the terminal 104 to other computing devices. The other computing devices may include one or more transaction processing systems 114 and one or more databases 112 that may store transaction, product, and other related data, depending on the particular embodiment.

As products are presented for purchase, the products may be scanned by the scanner 102, which then provides a product identifier, such as a Universal Product Code (UPC) to the terminal 104. When all products have been presented, the customer then typically pays for presented items by tendering a payment. When the payment is tendered, one or more documents may be provided to complete the transaction. The documents to be presented may depend in part on the products being purchased. In some embodiments, the terminal 104 may send a signal to the scanner 102 indicating a document is to be scanned and may identify the particular document type. The document may then be presented to the scanner 102 and the scanner 102 captures an image thereof either via a product scanning camera included in the scanner 102 or an external camera such as one of cameras 106 and 108].

For example, when a controlled item is being purchased, such as tobacco, alcohol, certain pharmaceutical products, and the like, an identification card such as a driver's license may be required to verify the age or identity of the customer. Similarly, when certain forms of payment are provided, the identity of the customer may also or alternatively need to be verified. In such circumstances where a document is required or otherwise provided, the scanner 102 may be utilized to capture an image of the presented document. While a person may view a document and verify the data contained thereon, capturing an image of the presented document(s) provides an auditable record to aid in legal and policy compliance and monitoring, fraud investigation, and increased transactional security. Further, captured document images may be processed to identify a type of document presented and to perform document-type specific processing and validation, as well as validation between imaged documents and even identity validation between images on identification cards and a customer image as may be captured by a customer-facing camera 106, when present.

When the scanner 102 scans and processes a document, data may be transmitted by the scanner 102 to the terminal 104 in some embodiments. For example, when the terminal 104 has sent a message to the scanner 102 to scan an identification card, the scanner 102 may capture an image of a presented identification card, process the image to validate an age or date of birth, and pass a validating signal back to the terminal 104 indicating validation success or failure. In some embodiments, the captured images, data captured from and validated with regard to images and documents included therein, is maintained securely within the scanner. In such embodiments, the images and data are not shared by the scanner 102 with the terminal 104. Instead, when such data is needed, it typically is not the raw data. Instead, the terminal 104 may only need to know whether the age of the customer is sufficient to purchase controlled items. In some other embodiments, only certain data may be shared, such as a name and address of the customer as may be required by law when the customer is purchasing a tracked item, such as certain pharmaceutical products that may be utilized in the manufacture of illegal drugs.

As generally described above, as documents images and images from one or more of the cameras are acquired, the images, in some embodiments, are processed to extract or recognize data therein, which forms metadata related to the respective documents. Validation may be performed against that data and between metadata and various images. The images, metadata, and records of the performed validation activities may then be bundled into one or more data structures and stored on the scanner 102 that performs the processing. The one or more data structures may also, or alternatively, be transmitted to the host terminal 104 over a local communications link, or over the network 110 to one or both of the database 112 and the transaction processing system 114. The one or more data structures, prior to transmission over the network 110, may be encrypted, in whole or in part. This data may then be utilized at a later time to audit or review activities performed at the terminal, such as to verify an identification card was checked before closing the transaction.

Figure 2:
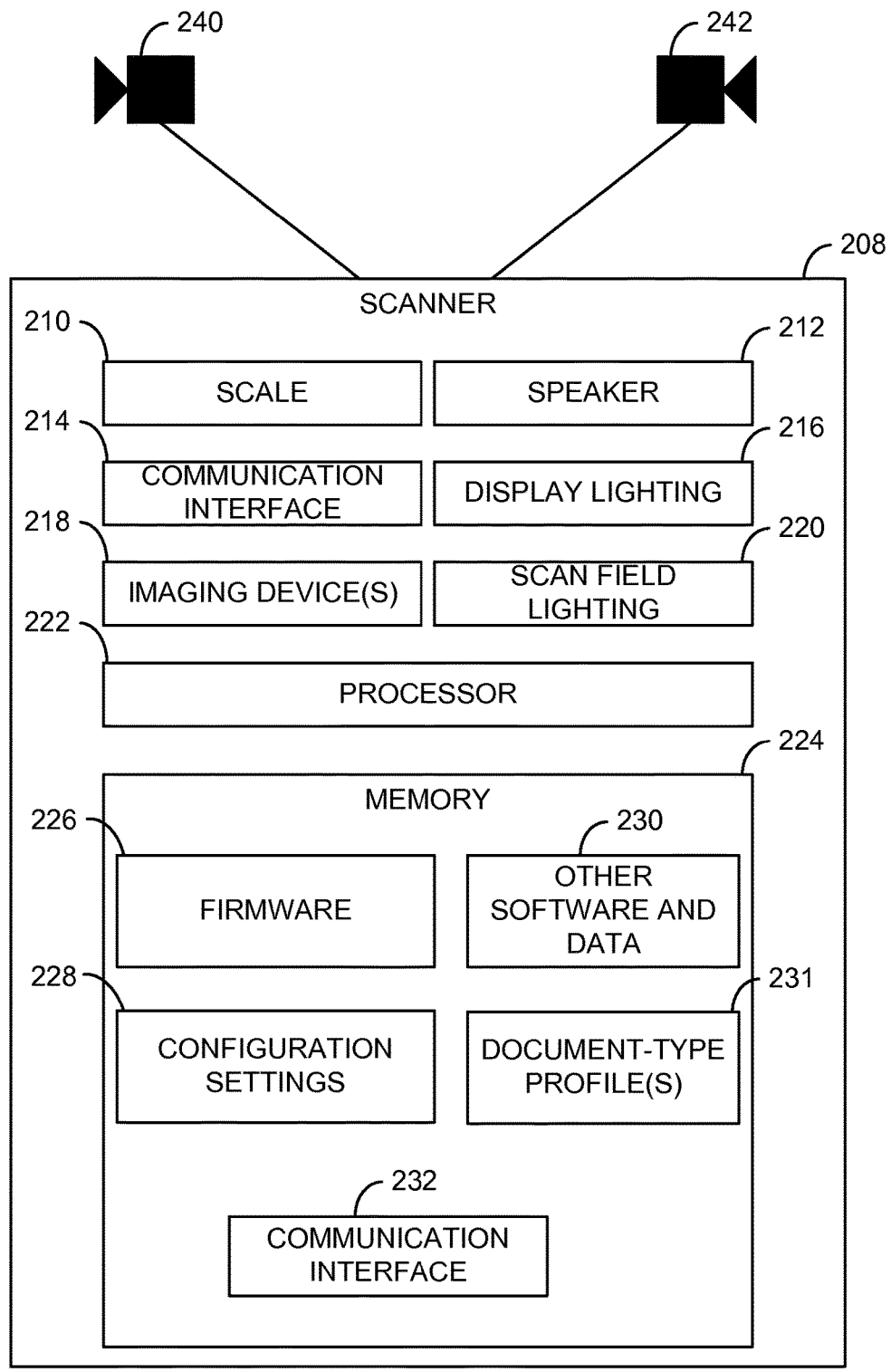
FIG. 2 is a block diagram illustrating the components of a product scanner, according to an example embodiment.

FIG. 2 is a diagram illustrating components of a scanner 208 that may be deployed at a checkout station such as a POS terminal, self-service terminal (SST), or other kiosk system including a scanner 208, according to an example embodiment. It is to be noted that the scanner 208 is shown schematically in greatly simplified form, with example components relevant to understanding various embodiments herein. Note that the scanner 208 may include more or fewer components in some embodiments.

Furthermore, the various components included in the FIG. 2 as illustrated and arranged are provided for illustration purposes only. It is to be noted that other arrangements with more or fewer components are possible without departing from the contributions herein, in particular with regard to in-scanner document image processing.

Moreover, the methods and scanner 208 presented herein and below may include all or some combination of the components described and shown in the various contexts herein. Further, although the scanner 208 may be paired with a POS terminal, the scanner 208 may be a standalone element or an element of other systems, devices, and terminals in other embodiments. Examples of other terminal-types that may include a scanner 208 are SSTs, clerk operated and self-service library checkout stations, time-keeping terminals, and the like. Additionally, although a scanner is illustrated in FIG. 2 according to some embodiments, the in-scanner document image processing described herein may also be implemented with regard to images and video streams generated by other devices, such as stand-alone cameras, such as one or more of cameras 240, 242 that may be coupled either directly or indirectly via a network to the scanner 208.

The methods of some embodiments are programmed as executable instructions in memory and/or non-transitory computer-readable storage media and executed on one or more processors associated with the components and devices herein. For example, some embodiments may be deployed as firmware present within the scanner 208, such as firmware 226. In other embodiments, the in-scanner document image processing functions may be deployed as software on the scanner or network deployed service accessible by the scanner.

The scanner 208 may be referred to herein as a product scanner or barcode scanner as that is the task most commonly associated with such devices. During operation, items are placed within a scan field of the scanner 208. One or more imaging devices 218 of the scanner 208, such as one or more cameras, then scan a barcode and information read therefrom is communicated to a POS system. The POS system then uses that data to identify the item placed within the scan field of the scanner 208 and performs an additional function. The additional function may include a price lookup and addition of the item to a list of items to be purchased, which may be presented on the one or more POS displays. The additional function may also include identifying a scanned product as a controlled item for which an age, identity, and/or address validation must be performed. A message may be presented on the one or more POS displays and a message may also be sent to the scanner 208 indicating an identification card or other document is to be scanned.

The scanner 208 may include one or more scan fields, such as two scan fields of bi-optic scanners that are commonly seen in grocery and discount retail outlets. In addition to the imaging devices 218, the scanner 208 may include various other components. The various other components may include an integrated scale 210 such as may be used in a grocery outlet to weigh produce and one or both of a speaker 212 and display lighting 216 to output audio a visual signals such as signals of (un)successful scans. The scanner 208 may also include scan field lighting 220 that may be turned on and off and adjusted based on a detected presence of an item to be scanned.

During typical operation, the scanner 208 is operated according to instructions executed on a processor 222. The processor 222 may be an application specific integrated circuit (ASIC), digital signal processor, microprocessor, or other type of processor. The instructions may be firmware 226 or software 230 stored in one or more memories 224. The one or more memories 224 may be or include volatile and non-volatile memories, write-protected memories, write-once memories, random access memory (RAM), read only memories (ROM), secure memory, and other memory and data storage types and devices.

The instructions as may be stored in firmware 226 or as software 230 in memory 224 are executed according configuration settings stored in the memory 224. The configuration settings 228 configure operation of the scanner 208 and the various components therein. For example, the configuration settings 208 may configure speaker 212 volume, display lighting 216 outputs, and scan field lighting 220 brightness. The configuration settings may also configure decoding algorithms of the imaging device(s) 218 and the instructions, one or more communication protocols used to communicate data from the scanner 208 to a POS system or other system via wired or wireless connections, and scale 210 operating parameters (e.g., unit of measure as pounds or kilograms). The configuration settings may also configure other settings of the particular scanner 208 an embodiment may include. In some embodiments, the configuration settings 228 may include a firmware version, a software version, and the like. Thus, when a configuration is set or updated, the setting or updating of the configuration settings 228 may include population and updates of any of the configuration settings 228 of a particular embodiment, including an update to firmware and software present on the scanner.

The scanner 208 may include one or more communication interfaces 214, 232 that enable the scanner 208 to communicate via one or both of wired and wireless connections over a network and with other computing devices. In some embodiments, the communication interface 232 may provide a virtualized communication connection on the scanner 208 that enables the scanner to communicate over a network leveraging network connectivity of a terminal or other computing device with which the scanner is paired, such as a POS terminal.

During operation, the one or more imaging devices 218 of the scanner 208 capture images, such as still images and frames of video. These still images and video may be stored within the memory 224 or other data storage device of the scanner 208, a terminal or other device paired therewith, or transmitted via one of the communication interface 214, 232 over a network. In other embodiments, the video is simply captured and processed on the scanner 208 and discarded. However, in some circumstances, certain images are needed, such as images of documents presented for payment, identity verification, and the like. In such instances, these images are processed according to instructions stored in software 230, firmware 226, or by passing such images to a network service via one of the communication interface 214, 232 for appropriate processing.

For example, such processing in some embodiments includes receiving a document image from an imaging device 218 of the scanner 208 and determining a type of the document of the document image.

To identify a document-type of a document included in a document image, document-type profiles are defined. A document-type profile 231 is stored in the memory 224 and includes data defining image features or parameters utilized in identifying a document-type. A document-type item profile may further include data defining processing parameters of actions to be performed by an image processing function or module with regard to an image once a particular document-type is identified.

The document-type defining data generally includes parameters used to define the document-type for an image processing function. The parameter may define shapes, text, symbols, alphanumeric patterns, relative proportions of two or more features, colors, and the like. For example, bankcards, such as credit and debit cards, have a standard shape and typically include card network logos and numbers presented in certain patterns, such as fifteen or sixteen numbers of a bankcard number. Further, driver's licenses and other government issued identification cards include certain patterns of information presentation. Similarly, checks include standardized features such as account and bank routing numbers located in certain locations and in a certain font.

The processing parameters of a document-type profile generally include one or more instructions that instruct the image processing function or module with regard to one or more actions that are to be performed on an image including a document of a particular document-type. Such actions may include recognizing and reading text or numbers from certain locations in the document image and/or obscuring a portion of an image including certain portions of sensitive information, such as an address, bankcard number, account numbers and a signature on a check, and the like. With regard to certain document-types, portions of a document image may also be extracted, such as an image of a person from a driver's license. The obscuring may include removing portions of the image including the sensitive information, changing a color of a portion of the image to all the same color such as black or grey, encrypting the image, and even removing the image from a still image or an image stream of video. Thus, in some embodiments, document content may not only be read and extracted, but certain portions of a document may also be obscured to increase security of sensitive data.

The processing of the image to determine the document type and the subsequent processing of the document image is performed to obtain data from which document metadata may be generated. The processing of the document image further includes adding the document image and metadata representative of the document metadata and document type to a data structure in the memory 224. In some embodiments, transaction related metadata is also added to the data structure, such as data that may be received from a terminal such as a transaction identifier or a date time stamp and a scanner 208 or terminal identifier.

Figure 3:
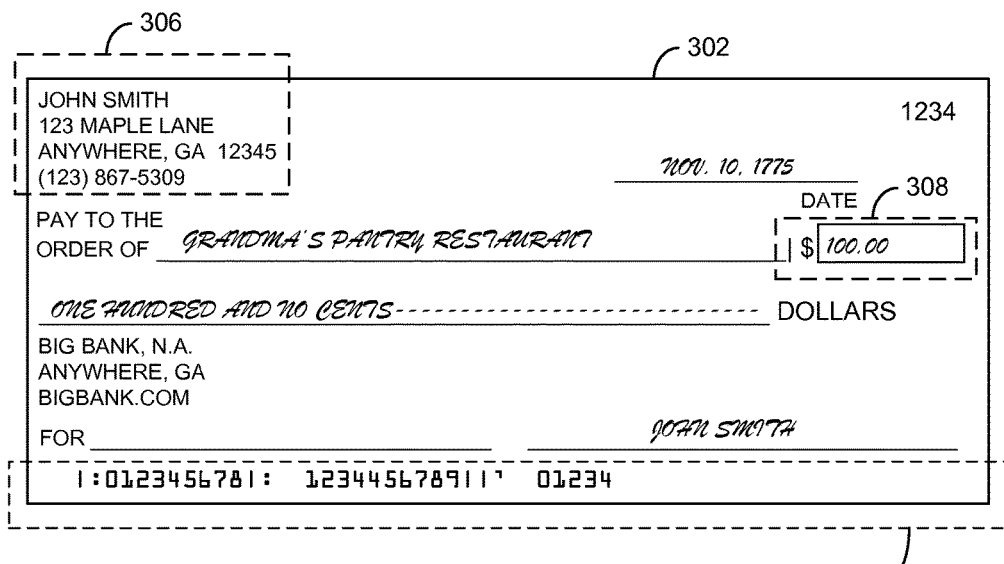
FIG. 3 illustrates a document that may be presented according to an example embodiment.

FIG. 3 illustrates a document that may be presented according to an example embodiment. The document illustrated in FIG. 3 is a check 302. The check 302 may be imaged by a scanner, such as scanner 102 of FIG. 1 or scanner 208 of FIG. 2. An image of the check may first be processed in view of a plurality of document-type profiles, such as document type profiles 231 of FIG. 2. Each of the document-type profiles includes data defining image features that define properties of the particular document-type and processing parameters of actions to be performed by an image processing function or module upon identification of the respective document type.

A document-type profile for identifying checks, such as check 302, may include data defining features of checks. Such features may include a number pattern 304 along a long-edge of a rectangular document and text-pattern of a name and address in an upper left-hand portion 306 of the document. Another feature may be a rectangular box 308 within which a number is present.

With regard to other document types, such as a driver's license, other features may be defined such as an image of a person in a particular area and various text patterns. For a document type of a bankcard, a fifteen or sixteen digit number or a month/year date field may be defined features.

Thus, once an image of a document is obtained by a scanner, an image processing function attempts to identify the document type in view of one or more document-type profiles. Once the document-type is identified according to a document-type profile, processing parameters of the respective profile may be executed against the image. The processing parameters may execute to obtain specific data from the image, such as by performing an optical character recognition function against specific document image portions or an entirety of document image. Certain data items may then be the subject of additional processing, such as with regard to the check 302, data read from the check may be submitted via a network to electronically process a payment with regard to the check 302 amount and the account from which the check 302 is drawn. Another example is when the document-type is a driver's license that includes an image of the person to whom the driver's license is issued. In some embodiments, the image of the person may be extracted from the document image, the scanner may capture an image from a camera coupled to the scanner directed toward the customer. The extracted image and the captured image may then be processed according to a facial recognition algorithm to determine if the images match to verify the person presenting the driver's license is the person to whom the driver's license was issued. Other document-types may be subject to similar or different processing parameters.

Figure 4:
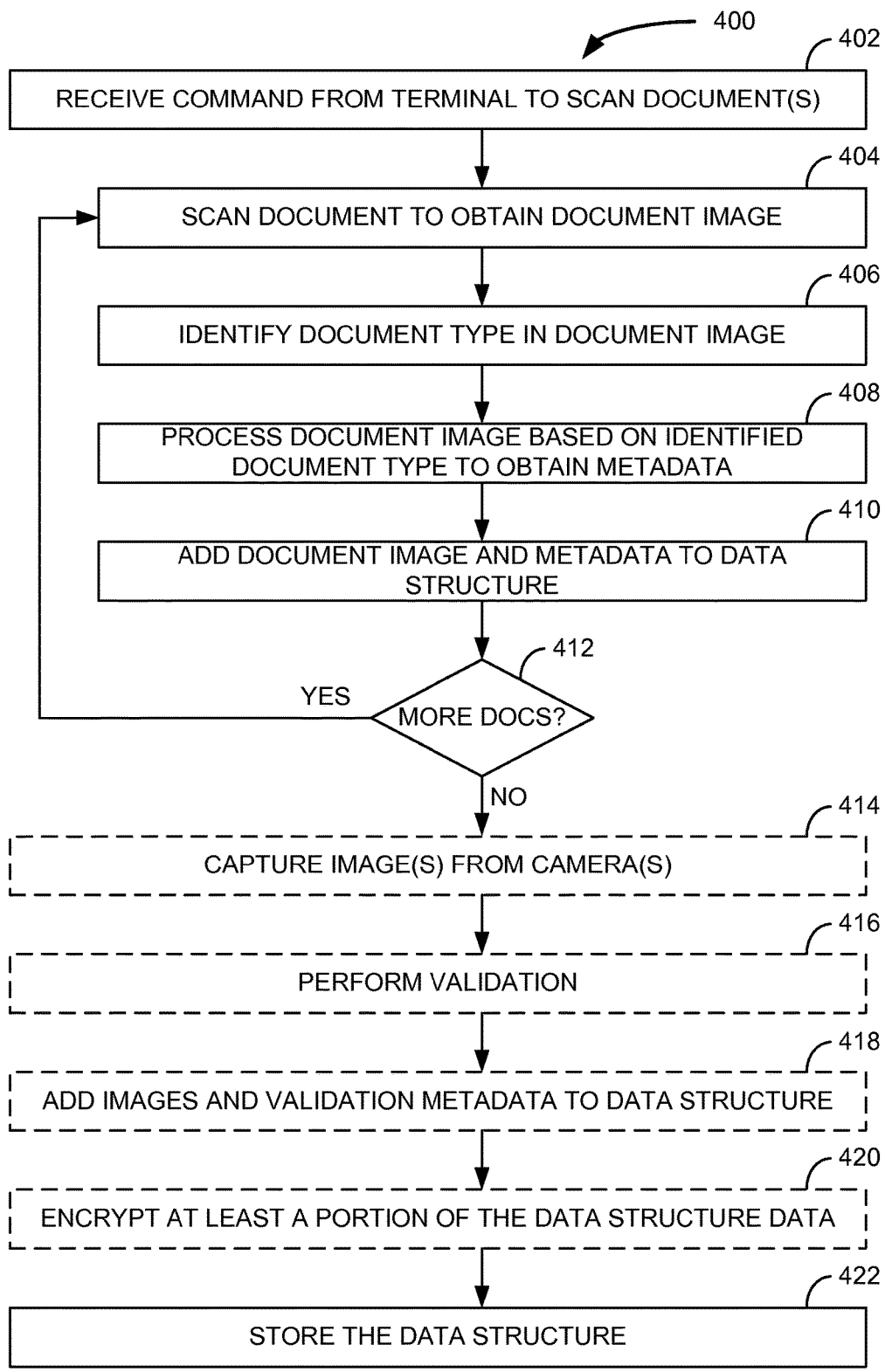
FIG. 4 is a block flow diagram of a method, according to an example embodiment.

FIG. 4 is a block flow diagram of a method 400, according to an example embodiment. The method 400 is an example of a method that may be performed by a scanner in performing in-scanner document image processing according to some embodiment.

The method 400 includes receiving 402 a command from a host system, such as POS terminal, to scan one or more documents. The scanner then scans 404 the document to obtain a document image. The document type is identified 406 in view of one or more document-type profiles and processed 408 in accordance therewith to obtain document metadata. The document image and metadata are then added 410 to a data structure. When 412 there are more documents to scan, the method again scans 404 a document and proceeds from there to add 410 the document and metadata therefrom to the data structure. When 412 there are no more documents to scan, the method 400 proceeds in view of configuration settings, document-type profile processing parameters, and details of the particular embodiment to perform optional functions or to simply store 422 the data structure.

The optional functions may include one or more of capturing 414 one or more images from one or more other cameras that may be coupled to scanner to obtain images of one or more of a customer, a cashier or other clerk, and the like. The optional functions may also include performing 416 validation of one or more documents from document images and captured images, which may also be performed in view of one or more rules associated with one or more products the customer is attempting to purchase, such as controlled products as described above. The optional processing may further include adding 418 images and validation metadata to the data structure and encrypting 420 at least a portion of the data structure prior to storing 422 the data structure.

In some embodiments, storing 422 the data structure includes transmitting the data to a database for storage, to a transaction processing system or other system associated with storing transaction related data.

Another embodiment in the form of a method includes receiving a document image from an imaging device of a scanner and determining a type of the document of the document image. The document image may then be processed to obtain document metadata and the document image and metadata representative of the document metadata and document type are added to a data structure. This method may further include adding transaction-related metadata to the data structure. The data structure may then be stored on the scanner, transmitted via a network to a database for storage, or transmitted via a network to another system for one or both of processing and storage.

In some embodiments, this method includes receiving a second image from a second imaging device of or coupled to the scanner and adding the second image to the data structure. In such embodiments, when the determined type of the document of the document image is an identification document including a picture of an individual, such as a driver's license, the processing of the document image to obtain document metadata includes extracting the picture. The method in such embodiments may then proceed by comparing the extracted picture to an individual present in the second image to verify the individual present in the second image is the same individual represented in the extracted picture. When the comparing identifies a match, the method may store data representative of the comparing match to the data structure. However, when the comparing fails to identify a match, the method may output a signal from the scanner indicating the failure to identify a match.

A further embodiment in the form of a method includes scanning each of a plurality of documents presented on a scanning surface of a scanner to obtain document images. This method then determines a type of each document of each document image and processes each document image to obtain a set of respective document metadata. Each document image and each respective set of document metadata including data representative of the respective document type is then added to a data structure and the data structure is stored.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
    receiving a document image from an imaging device of a scanner;
    determining a type of the document of the document image from a plurality of possible document types, the document type is determined by comparing parameters of document-type profiles stored in a memory of the scanner, all document type profile including:
        document-type identifying parameters including definitions of a plurality of shapes, text, symbols, alphanumeric patterns, and relative proportions of two or more features; and
        document-type processing parameters;
    processing the document image to obtain document metadata;
    adding the document image and metadata representative of the document metadata and document type to a data structure;
    adding transaction-related metadata to the data structure; and
    storing the data structure.

2. The method of claim 1, wherein storing the data structure includes transmitting the data structure via a network from the scanner to a database storing transaction-related data.

3. The method of claim 1, wherein prior to storing the data structure the method further comprises:
    receiving a second document image from the imaging device of the scanner;
    determining a type of the document of the second document image;
    processing the second document image to obtain second document metadata; and
    adding the second document image and metadata representative of the second document metadata and document type of the second document image to the data structure.

4. The method of claim 1, wherein storing the data structure includes:
    encrypting at least a portion of the data added to the data structure.

5. The method of claim 1, further comprising:
    receiving a second image from a second imaging device of or coupled to the scanner; and
    adding the second image to the data structure.

6. The method of claim 5, wherein when the determined type of the document of the document image is an identification document including a picture of an individual, the processing of the document image to obtain document metadata includes extracting the picture, the method further comprising:

comparing the extracted picture to an individual present in the second image to verify the individual present in the second image is the same individual represented in the extracted picture;

when the comparing identifies a match, storing data representative of the comparing match to the data structure; and when the comparing fails to identify a match, outputting a signal from the scanner indicating the failure to identify a match.

7. The method of claim 1, further comprising:

outputting at least one element of the document metadata obtained from the processing of the document image to a terminal operatively coupled to the scanner.

8. The method of claim 7, wherein the at least one element of document metadata output to the terminal is at least one of a date of birth, an age, and a logical flag indicating whether age is sufficient to purchase controlled items.

9. A method comprising: scanning each of a plurality of documents presented on a scanning surface of a scanner to obtain document images; determining a type of each document of each document image from a plurality of possible document types, a document type is determined by comparing parameters of document-type profiles stored in a memory of the scanner, all document profile including: document-type identifying parameters including definitions of a plurality of shapes, text, symbols, alphanumeric patterns, and relative proportions of two or more features; and document-type processing parameters; processing each document image to obtain a set of respective document metadata; adding each document image and each respective set of document metadata including data representative of the respective document type to a data structure; and storing the data structure.

10. The method of claim 9, wherein storing the data structure includes:

encrypting at least a portion of the data added to the data structure; and providing the data structure to a terminal operatively coupled to the scanner.

11. The method of claim 9, further comprising:

adding transaction-related metadata to the data structure; and wherein storing the data structure includes transmitting the data structure via a network from the scanner to a database storing transaction-related data.

12. The method of claim 9, further comprising:

receiving a second image from a second imaging device of or coupled to the scanner; and adding the second image to the data structure.

13. The method of claim 12, wherein when the determined type of one of the plurality of documents is an identification document including a picture of an individual, the processing of that document image to obtain document metadata includes extracting the picture, the method further comprising:

comparing the extracted picture to an individual present in the second image to verify the individual present in the second image is the same individual represented in the extracted picture;

when the comparing fails to identify a match, outputting a signal from the scanner indicating the failure to identify a match.

14. A scanner comprising:
at least one processor;
at least one memory device;
at least one imaging device;
a communication interface device;
instructions stored in the at least one memory device and executable by the at least one processor to perform data processing activities comprising:

receiving a document image from a first imaging device of the at least one imaging devices;

determining a type of the document of the document image from a plurality of possible document types, a document type is determined by comparing parameters of document-type profiles stored in the at least one memory device, all document profile including:
document-type identifying parameters including definitions of a plurality of shapes, text, symbols, alphanumeric patterns, and relative proportions of two or more features; and
document-type processing parameters;

processing the document image to obtain document metadata; and adding the document image and metadata representative of the document metadata and document type to a data structure in the at least one memory device.

15. The scanner of claim 14, wherein:
the data processing activities further comprise:

adding transaction-related metadata to the data structure; and transmitting the data structure via the communication interface device over a network to a database storing transaction-related data.

16. The scanner of claim 14, the data processing activities further comprising:

receiving a second document image from the first imaging device;

determining a type of the document of the second document image;

processing the second document image to obtain second document metadata; and adding the second document image and metadata representative of the second document metadata and document type of the second document image to the data structure.

17. The scanner of claim 14, the data processing activities further comprising:

receiving a second image from a second imaging device of or coupled to the scanner;

adding the second image to the data structure; and wherein when the determined type of the document of the document image is an identification document including a picture of an individual, the processing of the document image to obtain document metadata includes:

extracting the picture of the individual from the document;

comparing the extracted picture to an individual present in the second image to verify the individual present in the second image is the same individual represented in the extracted picture;

when the comparing identifies a match, storing data representative of the comparing match to the data structure; and when the comparing fail to identify a match, outputting a signal from an output device of the scanner indicating the failure to identify a match.

* * * * *